Nov. 4, 1958  C. E. MICHELSON ET AL  2,859,164
SAMPLING DEVICE FOR pH MEASUREMENT IN PROCESS STREAMS
Filed April 10, 1957  2 Sheets-Sheet 1
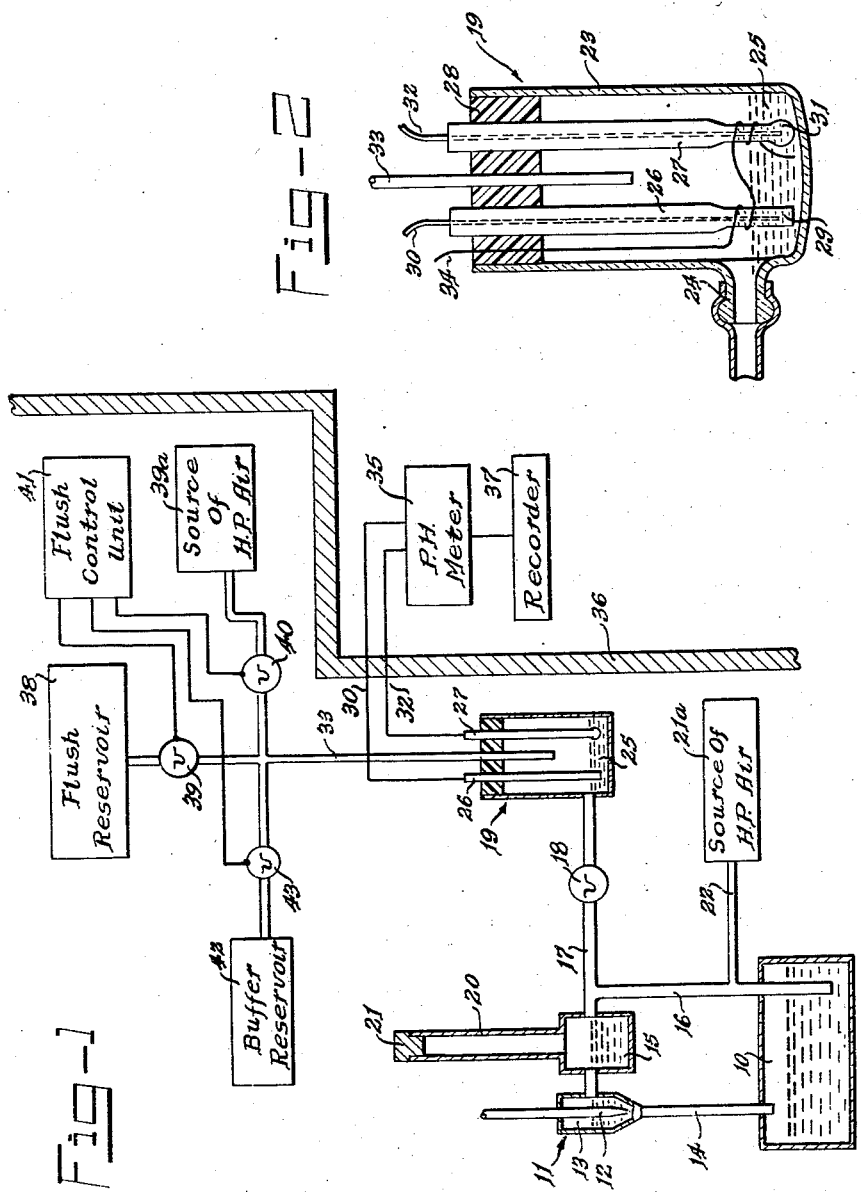
INVENTORS
Christian E. Michelson
William N. Carson, Jr.
BY
Roland A. Anderson
Attorney

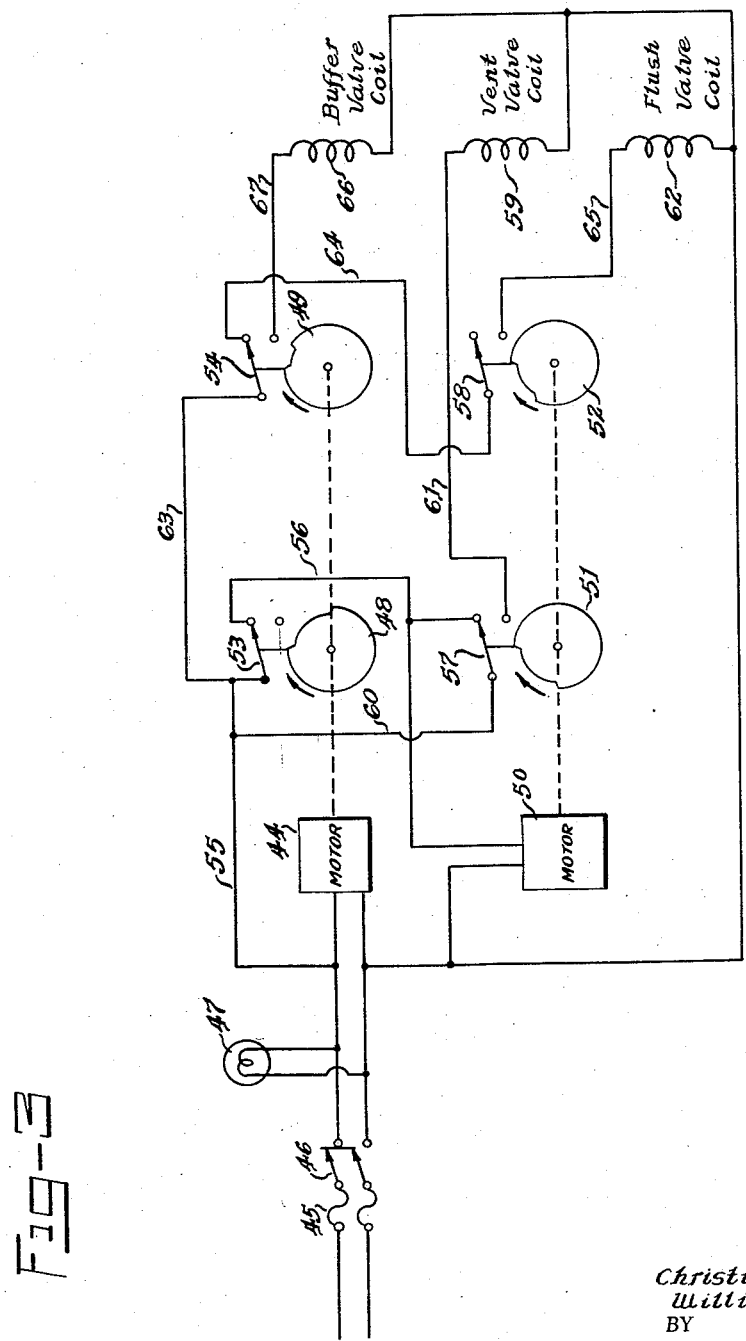

United States Patent Office 2,859,164
Patented Nov. 4, 1958

2,859,164

SAMPLING DEVICE FOR pH MEASUREMENT IN PROCESS STREAMS

Christian E. Michelson and William N. Carson, Jr., Scotia, N. Y., assignors to the United States of America as represented by the United States Atomic Energy Commission Application April 10, 1957, Serial No. 652,072

3 Claims. (Cl. 204—195)

This invention relates to the measurement of the hydrogen ion content in process streams and, more particularly, to a novel apparatus for continuously monitoring process streams wherein the recorded results obtained by the apparatus not only indicate the hydrogen ion content of the process stream but also indicates the proper functioning of the apparatus.

This invention is particularly useful in monitoring process streams where accessibility to the monitoring apparatuses is limited. The simplicity of the apparatus of this invention plus the malfunction indicating feature make it particularly adaptable to monitoring radioactive streams where the sampling equipment must be shielded for the protection of human beings.

An object of this invention is to provide an apparatus for the reliable measurement of the hydrogen ion concentration in process streams.

Another object of this invention is to provide a reliable apparatus for measuring the hydrogen ion concentration in process streams which will operate without constant operator attention and is easy to maintain.

Another object of this invention is to provide a reliable apparatus for measuring the hydrogen ion concentration in process streams in which malfunctions due to clogging by deposits in the process stream are reduced to a minimum.

Still another object of this invention is to provide an apparatus for the reliable measurement of the hydrogen ion concentration of process streams wherein the recorded results obtained by the apparatus indicates the proper functioning of the apparatus.

It is another object of this invention to provide an apparatus for the reliable measurement of the hydrogen ion concentration in process streams which is provided with an automatic means for standardizing the equipment to maintain an accurate measurement of the fluids passed therethrough.

Further objects and advantages of the invention will be evident from the following description of an exemplary embodiment.

Referring to the drawings:

Figure 1 is a diagrammatic view illustrating the monitoring apparatus of the present invention.

Figure 2 is a sectional view of a pH cell constituting part of the monitoring apparatus.

Figure 3 is a view illustrating the electric circuit of the flush-control unit.

The system shown in Figure 1 is particularly adapted for use in monitoring the hydrogen ion concentration of a radioactive process stream such as is shown flowing in a process vessel 10. A vacuum pump 11 comprising an air nozzle or jet 12, a vacuum chamber 13 and a discharge pipe 14 to the process vessel 10, is connected through a bayonet sampler 15 to a pipe 16, serving as an intake through a pipe 17 and a manually operated valve 18 to a pH cell 19. The bayonet sampler 15 is fitted with a long neck 20 and capped by stopper 21 to provide an access for taking process stream samples from the device. A source 21a of high-pressure air is connected through pipe 22 to the intake pipe 16 at a point between the process vessel 10 and the junction with the pipe 17.

The pH cell 19 can best be described with reference to Figure 2 and includes a glass cup 23 with a side entry arm 24 located just above the bottom of the glass cup 23. This side arm location causes the bottom portion of the glass cup to form a reservoir 25 permitting trapping of samples of the process stream which enter the pH cell through the side arm 24. A glass electrode 26 and a reference electrode 27 are sealed into the cell 19 by means of a cold-setting plastic cap 28. The glass electrode 26 contains the usual internal solution 29 which is connected to the usual output lead 30. The reference electrode 27 is formed of saturated calomel having a salt bridge in its bottom portion fabricated of a porous glass to ensure low electrolyte flow therein. A suitable glass for this use is one having a dry density of 1.45 gm./cm.$^3$, void spaces of 28% of the volume, an average pore diameter of 4 millimicrons, a flow rate of .00065 cc./cm$^2$/hr. at 2 mm. thickness for water applied thereto at one atmosphere pressure, and the following composition in weight percent:

| | |
|---|---|
| $SiO_2$ | 96 |
| $B_2O_3$ | 3 |
| $Al_2O_3 + Fe_2O_3$ | 0.4 |
| Alkali (Na) | trace |
| Arsenic | trace |

The electrodes 26 and 27 extend into the glass cup 23 far enough that their lower ends lie just below the level of the fluid retained in the reservoir 25 so as to be constantly immersed therein. A flush tube 33 leads into the pH cell 19, through which buffer and flush solutions are introduced. A ground wire 34 is provided in the assembly to ensure constant electrical grounding of the sample. As shown in Figure 1, the electrode leads 30 and 32 are electrically connected to a pH meter 35 which is located behind a radiological shield 36. A recorder 37 is connected to the pH meter 35 for constantly recording in permanent form the results obtained by the pH cell 19. The pH meter 35 may be of any standard type such as the Beckman RX pH meter, and the recorder may take any form; however a circular chart type recorder, such as a Foxboro recorder, was found advantageous.

The sampling system hereinbefore described operates in the following manner. When the jet 12 is turned on, the passage of air therethrough creates a vacuum in the vacuum chamber 11, the bayonet sampler 15, the pH cell, and pipes 16 and 17. When the vacuum is sufficiently high, fluid rises in the pipe 16. Air from the source 21a is also introduced into the pipe 16 through the pipe 22, causing the fluid rising in pipe 16 to be mixed with bubbles of air. The air and fluid are circulated through the sampler 15 into the vacuum chamber 11 and back into the process vessel 10. The air introduced into the pipe 16 causes the fluid therein to rise in intermittent slugs, thereby continually changing the vacuum in the pH cell 19, pipe 17, bayonet sampler 15, and the vacuum chamber 11. When the system is full of fluid, the vacuum is greatest, but, when an air bubble enters, the vacuum is reduced. Sample fluid leaves the pH cell 19 when the vacuum is greatest, and enters when the vacuum is reduced. A portion of the sample, however, always remains in the reservoir portion 25 of the pH cell 19. The manual valve 18 is included in the system to permit the isolation of the pH cell 19 from the sampler 15 when samples are to be taken therefrom or when the sampler is to be flushed with a high pressure water hose to remove any obstructions which may be causing a malfunctioning of the device.

A flush reservoir 38 containing a wash solution of predetermined pH value substantially different from the range of pH values of the process stream fluid, is connected through an automatically controlled valve 39, hereafter called a flush valve, to the inlet tube 33. A source of air 39a is also connected to the inlet tube 33 through another automatically controlled valve 40 hereafter called a vent valve. The air and the wash solution are admitted to the pH cell 19 through the inlet tube 33 at 10 minute intervals to flush the system, thereby lessening the malfunction by clogging from any foreign matter in the process stream. The meter 35 and recorder 37 measure and record the pH value of the wash solution at 10 minute intervals, thereby indicating the proper functioning of the apparatus. It will be noted that a steady reading of the pH value of the process stream with no peaks to the pH value of the wash solution indicates a malfunction somewhere in the wash solution introducing mechanism while a steady reading of the pH value of the wash solution would indicate a breakdown of the process stream introducing mechanism. The valves 39 and 40 are automatically controlled by the flush-control unit 41 hereinafter described.

A buffer reservoir 42 is also connected to the inlet tube 33 through a third automatic valve 43 hereafter called a buffer valve. The buffer fluid stored in the reservoir 42 is of a predetermined pH value and is used to standardize the system. The buffer fluid is automatically introduced into the pH cell once every hour, and its measured pH value is noted on the recorder. Any deviations from the recorded pH value of the buffer from the known pH value of the buffer solution are used as a correction factor on the readings for the process stream samples being measured. The automatically controlled valve 43 for the buffer reservoir 42 is also controlled by the flush-control unit 41.

The flush-control unit 41 is employed to operate the valves 39, 40, and 43 to admit the buffer and flush solutions and air. Figure 3 shows diagrammatically the wiring scheme for the flush-control unit 41. A source of power, not shown, is connected to a motor 44 through fuses 45 and manual switch 46, indicator light 47 being lit when the manual switch 46 is in its closed position. The motor 44 is operated at $\frac{1}{60}$ of a revolution per minute; cams 48 and 49 are drivingly connected therewith in a two-to-one ratio so that they make a complete revolution once every two hours. The motor 50 operates at $\frac{1}{10}$ of a revolution per minute and cams 51 and 52 are drivingly connected therewith at a one-to-one ratio so that they make one complete revolution every ten minutes.

To describe the operation of the flush-control unit 41, let it first be assumed that cams 48 and 49 are revolved to a position such that switches 53 and 54, respectively, are actuated to their upper positions. Power is then being supplied to the $\frac{1}{10}$ R. P. M. motor 50 through lines 55, switch 53, and line 56. When the $\frac{1}{10}$ R. P. M. motor 50 rotates to a certain point, cams 51 and 52 also rotate to a certain point such that switches 57 and 58, respectively, drop to their lower positions. In the lower position of switch 57 power is supplied to a coil 59 for the vent valve 40 through line 60, switch 57, and line 61. In the lower position of switch 58 power is delivered to a coil 62 for the flush valve 39 through line 63, switch 54, line 64, switch 58, and line 65. The supply of power to the vent-valve coil 59 and flush-valve coil 62 causes them to open, admitting air and wash solution to the sampler through the inlet tube 33. The amount of air supplied is sufficient to reduce the vacuum in the sampler system to the point where circulation of process stream sample is stopped. The wash solution replaces the process fluid in the reservoir 25 of the pH cell 19 and the pH meter 35 reads the pH of the wash solution. As the $\frac{1}{10}$ R. P. M. motor 50 continues to rotate, cam 52 is actuated to cause switch 58 to return to its upper position, thereby cutting off power to the flush-valve coil 62 causing the flush valve 39 to close. However, the vent valve 40 stays open for an additional 15 seconds allowing the wash solution to be cleared from the inlet tube 33. Upon the removal of power from coil 59 by the operation of cam 51 returning switch 57 to its upper position, the vent valve 40 closes, the system becomes vacuum tight, and the jet 12 will again be able to pull process stream fluid from the process stream tank 10. This flush operation is repeated every 10 minutes.

When the $\frac{1}{60}$ R. P. M. motor 44 rotates far enough to start the "standardization" cycle, cam 48 will cause switch 53 to drop to its lower position thereby removing power along one path to the $\frac{1}{10}$ R. P. M. motor 50. However, the $\frac{1}{60}$ R. P. M. motor 44 continues to receive power through line 55, line 60, and switch 57, which is in its upper position, until the flush cycle is reached, at which time power is removed from the $\frac{1}{10}$ R. P. M. motor 50 and the cams 51 and 52 stop rotating. The vent-valve coil 59 and the flush-valve coil 62 are energized and their respective valves 40 and 39 are held open flushing the pH cell 19 until cam 49 operates to cause switch 54 to drop to its lower position at which time power is removed from the flush-valve coil 62 and is supplied to the buffer-valve coil 66 through line 55, line 63, switch 54 in its lower position, and line 67. The buffer valve 43 operates so that the buffer fluid plus the air stream are now fed into the pH cell 19 through the inlet tube 33, the buffer fluid displacing the liquid in the reservoir 25 at the bottom of the pH cell 19, thus causing the pH meter 35 to indicate the pH of the buffer fluid. Since the pH of the buffer fluid is known, deviations recorded by the pH meter may be noted and applied to readings associated with the process stream fluid to arrive at correct values for that fluid. The buffer solution flows for a period of one minute at which time cams 48 and 49 operate to return their respective switches 53 and 54 to their upper positions. Switch 54 cuases the power to be cut off from the buffer-valve coil 66 and reapplied to the flush-valve coil 62. The operation of switch 53 causes power to be again supplied to the $\frac{1}{10}$ R. P. M. motor 50 causing the control unit 41 to continue with the flush cycle. The buffer cycle is repeated every two hours.

The materials used in the constituent parts of this sampling device are not critical. It is necessary only that the materials used be chemically inert to the process stream fluid, the flush or wash fluids, and the buffer fluids. It is recommended that the wash solution used in the device be acidic in content if the process stream fluid being monitored is alkaline, or vice versa. The buffer solution would best be on the alkaline side if the process stream is so.

Various changes and modifications can be made without departing from the spirit of the invention as defined in the appended claims.

What is claimed is:

1. A device for monitoring the hydrogen ion concentration of the fluid in a process stream comprising, a pH cell having its bottom end forming a shallow reservoir and adapted to generate an electric current proportional to the pH value of a fluid in the reservoir, a process vessel for containing the process stream, an intake line between the vessel and the pH cell, a jet operated vacuum pump connected to the intake line for causing fluid to flow in the intake line, an air supply connected to the intake line between the vessel and the pump for causing samples of process stream fluid to intermittently flow into and out of the pH cell, a portion of the process stream remaining in the reservoir, an inlet to the pH cell, means for introducing air into the pH cell through the inlet to stop the flow of process stream fluid into the pH cell, means for introducing a wash solution fluid of predetermined pH value substantially different from the range of pH values of the process stream into the pH cell through the inlet, cam driven means for controlling the air introducing means and the wash fluid introducing means to replace the process stream fluid in the reservoir therewith at predetermined intervals, and means electrically connected to the pH cell and responsive to the electric current generated therein for continuously measuring and recording the pH of the fluid in the reservoir whereby a constant recording of the pH value of the wash fluid would indicate a failure of the sample introducing means and a constant recording of the pH value of the process stream fluid would indicate a failure of the replacing means.

2. A device as defined in claim 1 comprising means responsive to the control means for periodically introducing a buffer solution fluid into the pH cell through the inlet for use in standardizing the device.

3. A device for monitoring the hydrogen ion concentration of the fluid in a process stream comprising a pH cell, said pH cell having a process stream fluid entry adjacent the bottom end thereof, a reservoir for process stream fluid formed at the bottom of said pH cell below said entry, a process vessel below said pH cell containing the process stream fluid, an intake line between the vessel and the entry to said pH cell, a pressurized air supply connected to said intake, a jet operated vacuum pump making connection with the intake line between the pH cell entry and the pressurized air connection whereby the process stream fluid intermittently flows into and out of the reservoir in the pH cell.

References Cited in the file of this patent
UNITED STATES PATENTS

| | | |
|---|---|---|
| 1,684,645 | Smith et al. | Sept. 18, 1928 |
| 2,396,934 | Wallace | Mar. 19, 1946 |
| 2,607,718 | Suthard | Aug. 19, 1952 |
| 2,758,079 | Eckfeldt | Aug. 7, 1956 |
| 2,782,151 | Suthard | Feb. 19, 1957 |